United States Patent [19]

McGann

[11] 4,133,567

[45] Jan. 9, 1979

[54] COMBINED CYCLE ELECTRIC POWER GENERATING SYSTEM WITH IMPROVEMENT

[75] Inventor: Rodney McGann, Santa Cruz, Calif.

[73] Assignee: Texaco Inc., New York, N.Y.

[21] Appl. No.: 795,694

[22] Filed: May 11, 1977

[51] Int. Cl.² .................................................. G05B 15/00
[52] U.S. Cl. ............................... 290/40 R; 60/39.18 B
[58] Field of Search ........................... 290/40 R, 40 A; 60/39.18 B, 39.28 R, 39.28 T, 241, 600, 624, 646; 235/151.21

[56] References Cited

U.S. PATENT DOCUMENTS

| | | | |
|---|---|---|---|
| 3,879,616 | 4/1975 | Baker et al. | 290/40 R |
| 4,047,005 | 9/1977 | Heiser et al. | 290/40 R |

Primary Examiner—Herman J. Hohauser
Attorney, Agent, or Firm—Thomas H. Whaley; Carl G. Ries; Henry C. Dearborn

[57] ABSTRACT

A combined cycle electric power generating system which drives two electric power generators at a constant speed. It employs a gas turbine to drive one of the generators and a steam turbine to drive the other. There is a combustor that supplies the gas to drive the gas turbine and there is an air compressor that feeds input air to mix with fuel into the combustor. The compressor is driven by the gas turbine. The exhaust from the gas turbine delivers heat to make steam for the steam turbine. And, there is means for throttling the inlet air to the compressor so that the whole system may be run at greatly reduced load without creating inefficient operation.

8 Claims, 4 Drawing Figures

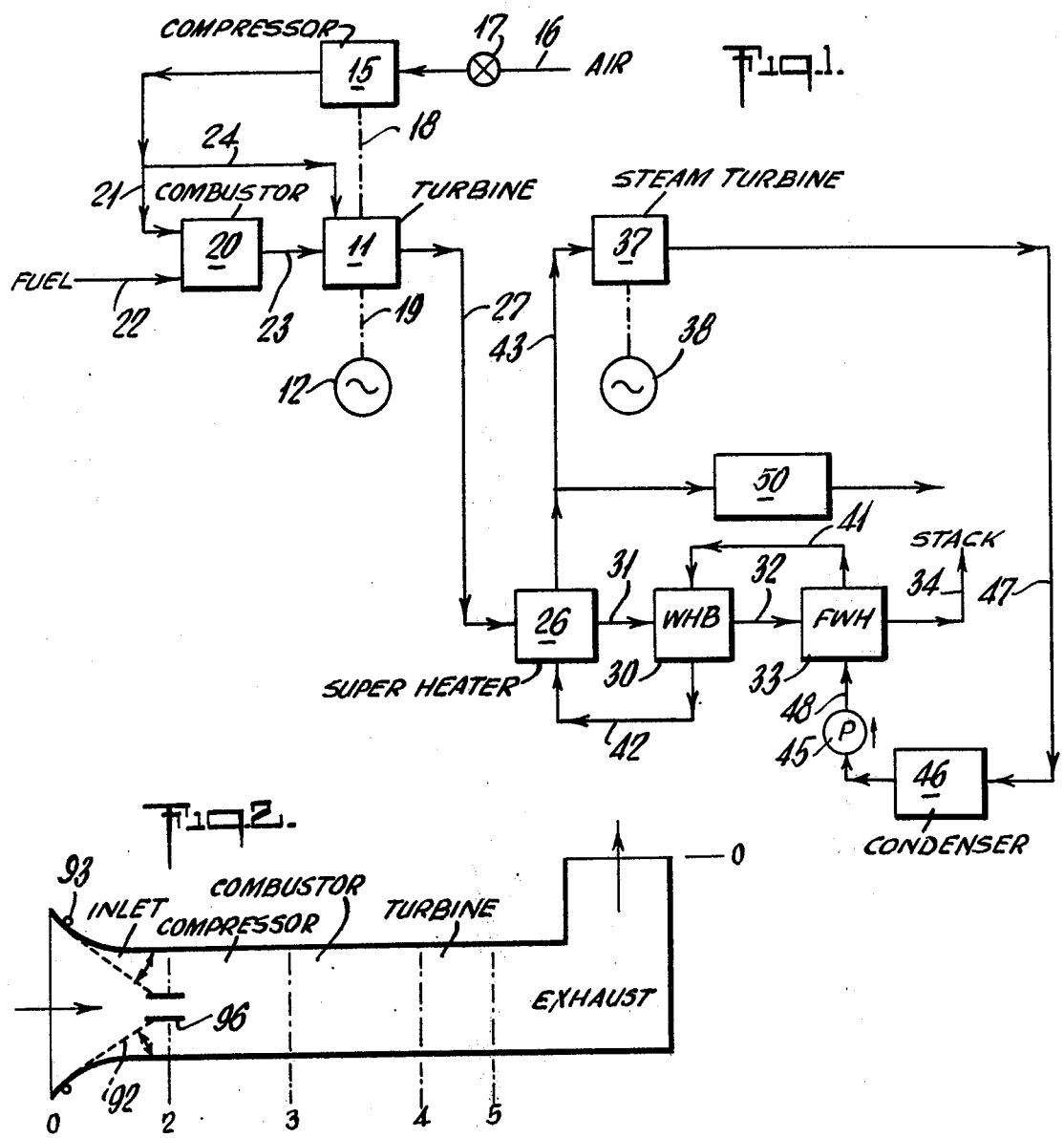
Fig. 1.
Fig. 2.
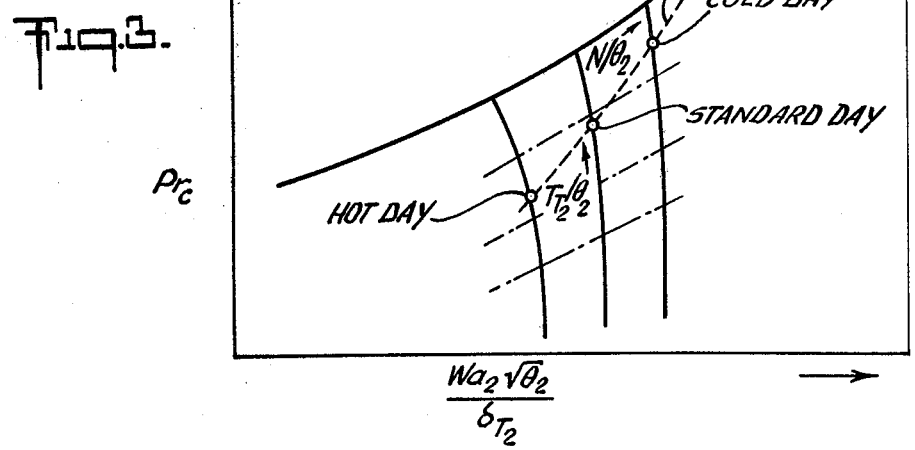
Fig. 3.

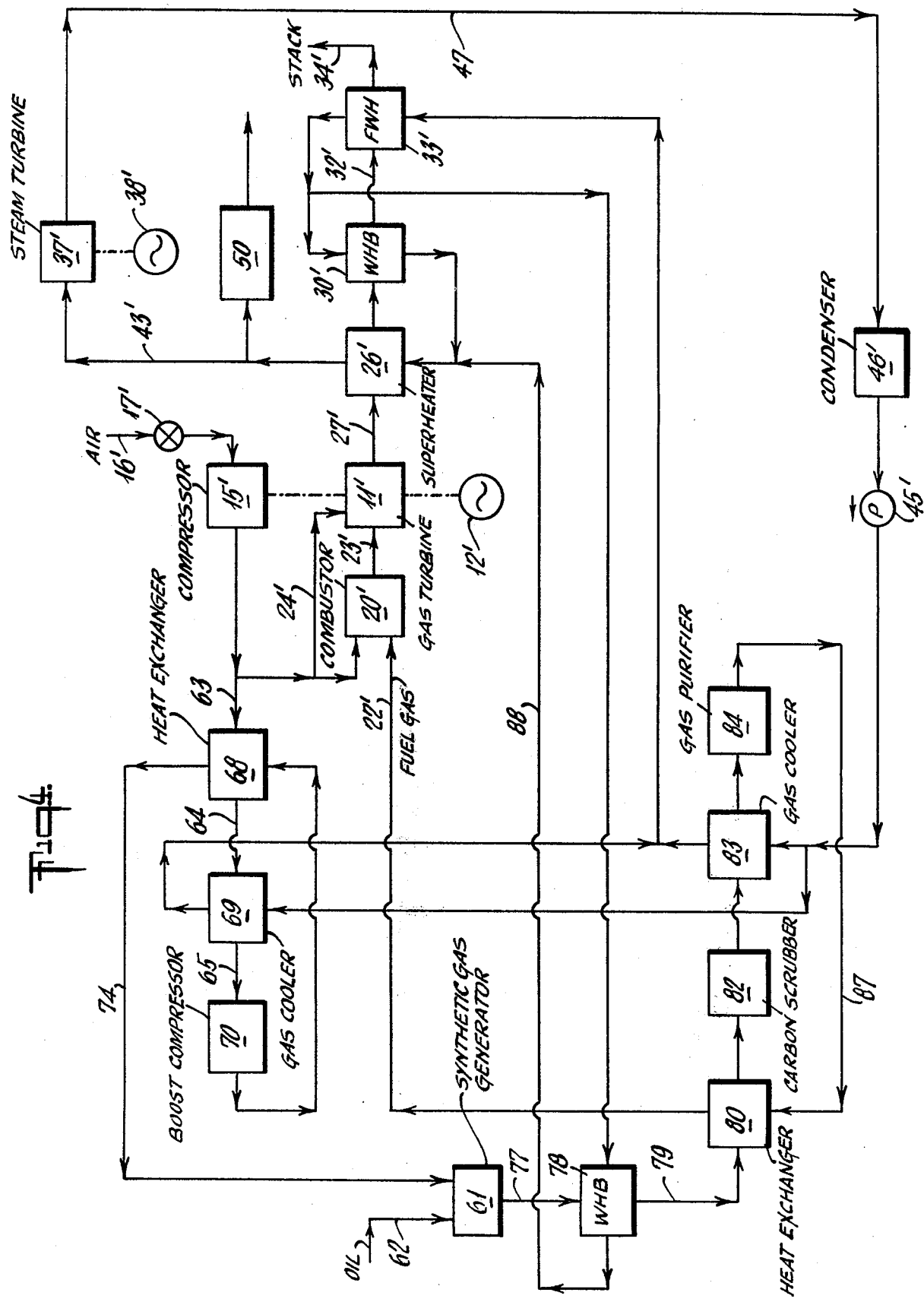

COMBINED CYCLE ELECTRIC POWER GENERATING SYSTEM WITH IMPROVEMENT

BACKGROUND OF THE INVENTION

1. Field of the Invention

This invention relates to the field of electric power generation, in general. More specifically it concerns a so-called combined cycle power generating system which employs at least two electric power generators one driven by a gas turbine and the other by a steam turbine.

2. Description of the Prior Art

While the use of a so-called combined cycle system in connection with electric power generation is known, it has been discovered that with a system consisting of one gas turbine and steam turbine a problem arises when it is desired to maintain efficient operation of the system at loads other than full load, particularly at loads as low as ¼ of full load. If the direct approach is to be employed of reducing the power level of both the gas turbine and the steam turbine of such combined cycle to ¼ load, the result creates a gross mismatch between the gas turbine and the steam cycle because of the low exhaust temperatures of the gas turbine with little reduction in exhaust mass flow.

Consequently, it is an object of this invention to provide an improvement for a combined cycle electric power generation system which permits the operation at greatly reduced loads without loss of efficiency.

Another object of the invention is to provide for a system that incorporates combined cycle electric power generation with a fuel gas generation system. The latter produces fuel for the combustor of the combined cycle system, and the total combination incorporates the improvement according to this invention for obtaining efficient operation under low loads.

SUMMARY OF THE INVENTION

Briefly, the invention is in combination with a combined cycle electric power generating system. Such system includes a constant speed gas turbine for driving a first electric power generator, and a combustor for supplying high temperature gas to drive said gas turbine. It also includes a compressor driven by said gas turbine for compressing air to be delivered to said combustor, and means for delivering fuel to said combustor with said compressed air. It also includes a steam turbine for driving a second electric power generator, and a boiler for supplying steam to drive said steam turbine. In addition, it includes means for connecting the outlet from said gas turbine to said boiler for supplying heat thereto. The improvement in combination with the foregoing system, comprises means for throttling the inlet of said compressor for maintaining efficient operation at low load on said electric power generators.

Again briefly, the invention concerns in combination, a fuel-gas generation system which includes means for generating synthesis gas from a hydrocarbon feed. The combination also has means for removing free carbon from said synthesis gas, and means for purifying said carbon free synthesis gas. The combination also includes a combined cycle electric power generating system that is integrated with said fuel-gas generation system. The said combined cycle system comprises a constant speed gas turbine for driving a first electric power generator, and a combustor for burning said purified synthesis gas to supply high temperature gas to drive said gas turbine. The combined cycle system also comprises a compressor driven by said gas turbine for compressing air to be delivered to said synthesis gas generating means and to said combustor. The said compressor has an air inlet, and the combination includes means for delivering said purified synthesis gas to said combustor with said compressed air. The combination also includes a steam turbine for driving a second electric power generator at a constant speed, and a pair of boilers for supplying steam to drive said steam turbine. One of said boilers is connected to the outlet from said synthesis gas generating means and the other of said boilers is connected to the outlet from said gas turbine. The combination also includes means for throttling said air inlet for controlling said combination, whereby good efficiency may be maintained at reduced load on said electric power generators.

BRIEF DESCRIPTION OF THE DRAWINGS

The foregoing and other objects and benefits of the invention will be more fully set forth below in connection with the best mode contemplated by the inventor of carrying out the invention, and in connection with which there are illustrations provided in the drawings wherein:

FIG. 1 is a block diagram illustrating a combined cycle power generating system incorporating the invention;

FIG. 2 is a schematic illustration indicating the components of a gas turbine and compressor-combustor combination, for purposes of explaining the invention;

FIG. 3 is a graph illustrating the principles involved in an explanation of the invention; and FIG. 4 is a block diagram illustrating a system which includes both a combined cycle generating system and a synthesis gas generation system, which together employ the improvement according to this invention.

DESCRIPTION OF THE PREFERRED EMBODIMENT

FIG. 1 illustrates a so-called combined cycle electric power generation system to which the invention is applicable. There is a constant speed gas turbine 11 that drives a first electric power generator 12. The turbine 11 is also mechanically connected directly to a compressor 15. It will be understood that the requirement for constant speed is imposed because of the fact that the electric generator 12 is being used to supply electric power to a utility electric power system. Therefore the speed must be maintained constant to keep the power frequency carefully regulated.

The compressor 15 has an inlet 16 which is indicated schematically by an arrow in FIG. 1. Also, there is an inlet throttling device, or valve means 17 located in the inlet 16 for controlling the amount of air intake to the compressor 15. This device 17 when throttling will cause a pressure drop, reducing the air pressure ($P_{i2}$ — defined subsequently) at the station where it flows into the compressor rotor. Throttling device 17 may consist of adjustable louvers, vanes, or other suitable air flow valves of negligible resistance when fully open. Such throttling structure is schematically illustrated in FIG. 2.

There is a combustor 20 that receives compressed air from the compressor 15, as indicated by an arrow 21. It also receives fuel as indicated by an arrow 22. Fuel is directed into the combustor along with the compressed air, and it is burned therein for creating the combustion produced hot gases that are then delivered to the inlet of the turbine 11, as indicated by an arrow 23. In addition there is a compressed air by pass which is indicated by an arrow 24. This air is used to cool bearings and/or blades (not shown) of the turbine 11.

The exhaust from turbine 11 goes to a super-heater 26, as is indicated by an arrow 27. Then, the exhaust gases continue on to a waste heat boiler 30, as indicated by an arrow 31. After that these gases continue on as indicated by an arrow 32 to a feed water heater 33, and then on to a stack, as indicated by the caption STACK adjacent to an arrow 34.

The other portion of the combined cycle employs a steam turbine 37 that drives a second electrical power generator 38 which shares the total electrical power load with the first generator 12.

Steam for driving the steam turbine 37 is formed in the waste heat boiler 30 which is supplied with heated feed water, as indicated by an arrow 41. Such feed water is supplied from the feed water heater 33. The steam from the waste heat boiler 30 is carried to the superheater 26 over a path indicated by an arrow 42. Thus, superheated steam is supplied to the steam turbine 37 via a path as indicated by another arrow 43.

Exhaust steam from the turbine 37 is recirculated via a condenser 46 which receives the exhaust steam over a path indicated by an arrow 47. The condensate from condenser 46 being a liquid, is pumped by a pump 45 and goes via the path indicated by an arrow 48 to the feed water heater 33 to continue in the steam cycle involved with the steam turbine. Of course, make-up water may be added as required, but no indication for this need be illustrated.

The combined cycle system described may employ various commercial elements to make-up the different portions of the system. For example, there are commercial gas turbines manufactured by different major American (U.S.) manufacturers, e.g., Turbodyne, General Electric, Westinghouse, and Turbo Power and Marine Systems. However, a preferred conventional gas turbine may be one manufactured by Turbodyne and designated model 11D-4. Such machine has three major components integrated into a single unit, i.e. the compressor 15, the combustor 20 and the turbine 11. It will be appreciated that the compressor 15, the turbine 11 and the electric generator 12 are mechanically connected together, as indicated by dashed lines 18 and 19.

It will be understood that some of the steam from the steam turbine cycle may be taken off to be used in an auxiliary process, if desired. This is indicated by a block 50 in the FIG. 1 diagram.

As indicated above, with a combined cycle electric power generating system like that just described (absent the air inlet throttling element 17), the problem of reducing the electric power load to a low level, e.g. one quarter of full load, has presented a problem with efficiency which is not overcome by merely reducing the load on the gas and steam turbines. Reduction of the load on both turbines in such manner results in a gross mismatch between the gas turbine and steam cycles, due to the low exhaust temperature of the gas turbine with little reduction in exhaust mass flow. However, it has been discovered that the difficulty may be overcome without using auxiliary burners in the exhaust ducts from the gas turbine. It is accomplish by employing throttling on the inlet air to the compressor. Such throttling accomplishes the desired temperature increase of the exhaust gas from the turbine by back pressuring it with a corresponding reduction in the exhaust mass flow.

A technical explanation for the accomplishment of the foregoing desired result is as follows, with reference to FIGS. 2 and 3. A stationary gas turbine unit 55 is illustrated in FIG. 2. It will be observed from the captions that it includes an inlet, an compressor, a combustor, a turbine and an exhaust. In order to relate the explanation to this schematic indication of the turbine unit 55, there have been numbers placed at the locations which indicate the joinder between the individual elements just named. Thus, the pressure ratio across the major components of this unit 55 may be expressed as follows:

$Pr_i = P_{t2}/P_o$;
$Pr_c = P_{t3}/P_{t2}$;
$Pr_{comb} = P_{t4}/P_{t3}$;
$Pr_t = P_{t4}/P_{t5}$; and
$Pr_x = P_{t5}/P_o$.

It will be understood that in the foregoing expression the symbols have the following meaning:

$Pr_i$ — is the pressure ratio across the inlet;
$P_{t2}$ — is the total pressure at station #2 on FIG. 2;
$P_{t3}$ — is the total pressure at the station #3 (which is the inlet end of the combustor);
$Pr_c$ — is the pressure ratio across the compressor;
$Pr_{comb}$ — is the pressure ratio across the combustor;
$P_{t4}$ — is the total pressure at station #4;
$Pr_t$ — is the pressure ratio across the turbine;
$P_{t5}$ — is the total pressure at the station #5;
$P_o$ — is the ambient pressure; and
$Pr_x$ — is the pressure ratio across the exhaust which is, of course, the ratio of the total pressure at station #5 to the ambient pressure at the discharge end of the exhaust.

The pressure ratio across the turbine may be expressed by the following equations as developed by the foregoing pressure ratios:

$$Pr_t = P_{t4}/P_{t5} = (P_{t2}/P_o)(P_{t3}/P_{t2})(P_{t4}/P_{t3})(P_o/P_{t5}) \qquad (1)$$

this may be expressed as:

$$Pr_t = Pr_I Pr_c Pr_{comb}/Pr_x \qquad (2)$$

The export work from the gas turbine is the difference between the turbine work output and the compressor work absorbed, which may be expressed as follows:

$$HP_x = HP_t - HP_c \qquad (3)$$

In equation 3, $HP_x$ stands for the horsepower output; $HP_t$ stands for the turbine horsepower; and $HP_c$ stands for the compressor horsepower.

The turbine and compressor work outputs may be expressed as a function of the variables indicated in the following equations $$HP_t = f[(Pr_t)^{(K-1)/K}, W_a, T_{t4}] \qquad (4)$$

$$HP_c = f[(Pr_c)^{(K-1)/K}, W_a, T_{t2}] \qquad (5)$$

In the foregoing equations it will be understood that the letter f is a function and the k is a constant, while the element Wa stands for the air mass, and the $T_{t4}$ and $T_{t2}$ stand for the temperature at the stations #4 and #2 respectively.

The FIG. 3 graph represents a typical compressor map. It will be observed that the graph plots the pressure ratio across the compressor as the ordinate, against the dimensionless ratio indicated, as the abscissa. The expression for the dimensionless ration uses the following symbols which are defined above and in the indicated manner below:

$$\theta = T_i/519.4°R \quad (T_i \text{ in } °R) \qquad (6)$$

$$\delta = P_i/14.69 \text{ PSIA} \quad (P_i \text{ in PSIA}) \qquad (7)$$

It will be understood that the expression for theta represents the temperature at the inlet referred to standard temperature degrees in the Rankine scale, while delta represents the pressure at the inlet referred to standard absolute pressure in pounds per square inch.

On the FIG. 3 graph, the parameter which is plotted along the abscissa is called the referred air flow. The parameter $N/\sqrt{\theta_2}$ which is represented by the nearly vertical family of curves, is called the referred rotational speed. And, $T_{t4}/\theta_2$ which is represented by the family of dashed line nearly horizontal curves is called the referred turbine inlet temperature. It will be noted that all of the parameters are referred to the station #2 on the FIG. 2 schematic. It will also be noted that the parameters $T_{t4}/\theta_2$ and $N/\sqrt{\theta_2}$ increase in the direction indicated by the arrows on the FIG. 3 graph. A dashed line 58 on the map shows the shift in operating point with ambient temperature at constant rotational speed N and constant inlet temperature to the turbine $T_{t4}$. This shift is as a result of the change in $T_{t2}$ and therefore $\theta_2$. It represents an increase in output power as ambient temperature decreases, since both mass flow and pressure ratio increase.

Output power can be decreased at constant rotational speed N by reducing the turbine inlet temperature $T_{t4}$ through a reduction in the fuel flow. However, it is desired to increase the exhaust temperature and decrease the mass flow so that good quality steam can be raised at a reduced rate, and thus permit the entire plant output to be reduced in the most efficient matter. Thus, with reference to the compressor map illustrated in FIG. 3, if $\delta_{t2}$ is reduced, Wa must reduce portionally since for a given ambient temperature $T_{t2}$ and a fixed rotational speed N there is only one speed line $N/\sqrt{\theta_2}$ along which the machine can operate. If $\delta_{t2}$ and Wa are reduced, then the export power will reduce due to the decrease to turbine pressure ratio $Pr_t$, since the exhaust pressure, $P_o$, has not changed. The original level of reduced (proportional to $\delta_{t2}$) export power can only then be maintained by increasing the turbine inlet temperature $T_{t4}$. The increase in $T_{t4}$ will in turn further increase $T_{t5}$ which is desired. Thus, it will be observed that throttling the inlet pressure to the compressor achieves the two desired results i.e. both higher exhaust temperature and lower exhaust mass flow. As explained, this is the only way to accomplish these results while maintaining a fixed rotational speed.

FIG. 4 MODIFICATION

Another modification which employs the principles of the invention concerns integrating a combined cycle power system, such as that described above in relation to FIG. 1, which a system for generating fuel gas e.g. a synthesis gas generating system. Thus, the elements of the combined cycle electric power generating system which are substantially the same as those illustrated and described in FIG. 1 are given the same reference numbers but use a prime mark therewith.

The fuel-gas generation system includes a synthesis gas generator 61 which has a hydrocarbon or other appropriate feed, e.g. oil, as indicated by the caption adjacent to an arrow 62. Also, compressed air is fed to the synthesis gas generator 61 from the output of the compressor 15' via a flow line that is indicated by arrows 63, 64 and 65 plus arrows 73 and 74. It will be observed that such flow line carries the compressed air through the respective elements indicated in the block diagram, i.e. a heat exchanger 68, a gas cooler 69, and a boost compressor 70. From the compressor the flow line is back, as indicated by the arrows 73, to pass through the heat exchanger 68 on the way to the input to synthesis gas generator 61 (as indicated by the arrows 74).

The output of the synthesis gas generator 61 is at high temperature and includes particulate carbon as well as undesired gases. However, this hot fluid flow is directed as indicated by an arrow 77 to another waste heat boiler 78, and then as indicated by an arrow 79, to a heat exchanger 80. From there the flow is to a carbon scrubber 82, and thereafter through a gas cooler 83 from which it flows through a gas purifier 84.

The output from the purifier 84 is then clean fuel gas which flows back via the path indicated by an arrow 87, through the heat exchanger 80 and over the fuel gas input line 22' to the combustor 20'.

It will be observed that the additional waste heat boiler 78 is connected in parallel with the waste heat boiler 30', so that the steam output from boiler 78 goes over the path indicated by an arrow 88 to join the path indicated by the arrow 42'. The combined flow is into the superheater 26'.

Feed water applied to the boiler 78 is obtained in parallel with the feed water input to the waste heat boiler 30', as indicated by an arrow 89. The output from the feed water heater 33' divides and goes into both the waste heat boiler 30' and the waste heat boiler 78 before being transformed into steam at the outputs of the boilers.

It will be clear that a combined cycle electric power generating system employed with a synthesis gas generating system, provides a combined system which is integrated so that the desired ability to operate at low loads with no severe reduction in efficiency may be obtained.

It will be noted that in FIG. 2 there is a schematic illustration to indicate one type of structure which may employed for the throttle valve means 17 or 17' in FIGS. 1 and 4. Thus, the throttle device could take many forms. But, in view of the fact that the inlet to the compressor will be a large diameter duct, the structure would most likely take the form of louvers 92, which are schematically indicated by dashed lines in FIG. 2. These would, of course, be hinged in any feasible manner. Such hinge structure is indicated by hinges 93 shown. Louvers 92 would move from full open position (making no interference with the air flow) to a predetermined maximum throttling position. The latter is indicated by the schematic showing in FIG. 2. Such maximum throttling might have a stop 96, e.g. a small diameter cylindrical passage as indicated. The side walls of cylinder 96 could act as stop means for preventing the complete closing of the inlet. Such arrangement provides for controlling the pressure drop through the inlet with a minimum of turbulence. It will be understood by any one skilled in the art that the throttle structure employed might take various forms which would be different from that generally indicated by the schematic showing in FIG. 2, without changing the substance of the results.

While a particular embodiment of the invention have been described above in considerable detail in accordance with the applicable statutes, this is not to be taken as in any way limiting the invention but merely as being descriptive thereof.

I claim:

1. In combination with a combined cycle electric power generating system including a constant speed gas turbine for driving a first electric power generator, a combustor for supplying high temperature gas to drive said gas turbine, a compressor driven by said gas turbine for compressing air to be delivered to said combustor, means for delivering fuel to said combustor with said compressed air, a steam turbine for driving a second electric power generator, a boiler for supplying steam to drive said steam turbine, and means for connecting the outlet from said gas turbine to said boiler for supplying heat thereto, the improvement comprising
   means for throttling the inlet of said compressor for maintaining efficient operation at low load on said electric power generators.

2. The invention according to claim 1, wherein said means for throttling, comprises
   valve means integral with said inlet.

3. The invention according to claim 2, wherein said valve means, comprises
   louvers for controlling the pressure drop through said inlet with a minimum of turbulence.

4. The invention according to claim 3, wherein said valve means, also comprises
   stop means for preventing the closing of said inlet.

5. In combination, a fuel-gas generation system including means for generating synthesis gas from a hydrocarbonaceous feed,
   means for removing free carbon from said synthesis gas,
   means for purifying said carbon free synthesis gas,
   a combined cycle electric power generating system integrated with said fuel-gas generation system,
   said combined cycle system comprising a constant speed gas turbine for driving a first electric power generator,
   a combustor for burning said pure synthesis gas to supply high temperature gas to drive said gas turbine,
   a compressor driven by said gas turbine for compressing air to be delivered to said synthesis gas generating means and to said combustor,
   said compressor having an air inlet,
   means for delivering said purified synthesis gas to said combustor with said compressed air,
   a steam turbine for driving a second electric power generator at a constant speed,
   a pair of boilers for supplying steam to drive said steam turbine,
   one of said boilers being connected to the outlet from said synthesis gas generating means and the other of said boilers being connected to the outlet from said gas turbine, and
   means for throttling said air inlet for controlling said combination whereby good efficiency may be maintained at reduced load on said electric power generators.

6. The invention according to claim 5, wherein said means for throttling, comprises
   valve means integral with said air inlet.

7. The invention according to claim 6, wherein
   said valve means comprises louvers for controlling the pressure drop through said air inlet with a minimum of turbulence.

8. The invention according to claim 7, wherein
   said valve means also comprises stop means for preventing the complete closing of said air inlet.

* * * * *